Nov. 24, 1964

R. R. ANDERSON 3,158,839

DATA TRANSLATING SYSTEM

Filed Dec. 15, 1958

2 Sheets-Sheet 1

INVENTOR
R. R. ANDERSON
BY Kenneth B Hamlin
ATTORNEY

Nov. 24, 1964 R. R. ANDERSON 3,158,839

DATA TRANSLATING SYSTEM

Filed Dec. 15, 1958 2 Sheets-Sheet 2

INVENTOR
R. R. ANDERSON
BY Kenneth B. Hamlin
ATTORNEY 3,158,839
DATA TRANSLATING SYSTEM Richard R. Anderson, Berkeley Heights, N.J., assignor to Bell Telephone Laboratories, Incorporated, New York, N.Y., a corporation of New York Filed Dec. 15, 1958, Ser. No. 780,579
13 Claims. (Cl. 340—172.5)

This invention relates to data translating, and more particularly, to apparatus and methods for translating data between coding systems employing either uniform or non-uniform information signaling rates.

While, heretofore, there have been proposed many methods for the representation of digital information, the design stringency of practical, high-speed information processing and computing systems, particularly as to compactness and convenience of data storage, has considerably narrowed the field of choice in the selection of appropriate coding methods. Additionally, it is often required that there be provided addressing, synchronizing, or error-checking data to supplement the intelligence signal being stored or being reproduced. Thus, a clock signal channel, in addition to the intelligence signal channel is frequently found as part of the memory device in such data handling systems. The provision of a separate clock signal channel, however, results in some degradation in the over-all compactness of the information storage function.

Among the many coding methods applicable to storage of digital information, by magnetic recording techniques for example, is the family of so-called non-return-to-zero, or NRZ, coding systems which include the well-known telegraphic signaling codes and the equally well-known Pouliart variation thereof. In the telegraphic signaling method, the binary digit "1" may be conveniently represented by a signal of given polarity and the binary digit "0" may be conveniently represented by a signal of opposite polarity. Transitions from one signal polarity to the other accordingly occur only when the sequence of information bits is changed; e.g., the sequence "0011," would be represented by a signal of one polarity during a first and a second time interval, a transition in signal polarity, and the persistence of the opposite polarity signal during a third and a fourth time interval. Magnetically, the sequence "0011" would be recorded by a single reversal of tape magnetization from saturation in one direction to saturation in the opposite direction, preceded and followed by intervals of steady magnetization. It is additionally necessary, however, that synchronizing signals be provided, as, for example, by a separately-recorded clock signal channel, to identify the time intervals and thereby individually distinguish each of the successive equal-value binary digits of the sequence occurring during the conditions of steady magnetization. Ultimately, energy storage considerations determine the duration of the minimum time interval within which a signal transition may be obtained and, accordingly, maximum signaling speed is obtained where the time interval, within which each of the binary digits is represented, approaches this minimum value.

In the Pouliart variation of telegraph signaling on the other hand, the binary digit "1" is indicated by a transition from one signal polarity to the other and the binary digit "0" is indicated by the absence of a transition in signal polarity during a time interval of corresponding duration. Magnetically, the above-mentioned sequence would therefore be recorded by two reversals of tape magnetization, preceded by two intervals of steady magnetization. It is here again necessary to provide separately-recorded synchronizing information to distinguish the information bits recorded by conditions of steady magnetization.

While from a consideration of the intelligence channel alone the telegraph method and Pouliart variation would appear to offer ultimate compactness of signal representation, i.e., highest packing factor, the requirement for separate synchronization data results in a considerable decrease in the overall density of data storage.

In addition to the above methods of NRZ encoding, a self-synchronizing hybrid NRZ coding arrangement is known which employs a double signal transition (RZ coding) to represent a "1" and which utilizes a single signal transition followed by a steady signal (NRZ coding) to represent a "0," (or vice-versa). This arrangement exhibits a somewhat poorer packing factor than the preceding two methods inasmuch as two time intervals are required for the representation of each "0" and of each "1" information bit. However, since a transition in signal polarity occurs for every information bit, i.e. at least one transition for every other time interval, this "two-time-interval-per-bit" coding scheme can be made self-synchronizing and consequently, requires no separate synchronization channel.

An improvement in the overall density of data storage over that offered by the last-mentioned hybrid NRZ coding scheme may be achieved by resorting to a coding scheme which utilizes variable-rate signaling, i.e., one in which the "0" and "1" bits are of different time duration. Such a scheme eliminates one of the time intervals used in the last-mentioned coding method thereby improving the packing factor. Thus, a single signal transition represents a "1" while a transition followed by an interval of steady signal represents a "0" (or vice versa). When the interval of steady signal is made equal to the minimum time interval within which a signal transition may be effected, a coding arrangement is obtained whose information density approaches that of the telegraphic or Pouliart methods, and which in addition, is self-clocking. Magnetically, the variable-rate coding scheme gives rise to what may be termed "half cell" recording, a "half cell" being defined as the minimum length of recording surface within which the magnetic state may be changed from saturation in one direction to saturation in the other. Thus a "1" bit occupies just a half cell-length while a "0" occupies a full cell-length. The sequence "0011" would be represented accordingly by a saturated half-cell, a transition (occupying a half-cell), a saturated half-cell and three consecutive transitions (each occupying a half-cell); a total of three magnetic cell-lengths as compared to four cell-lengths required in two-time-interval-per-bit coding scheme. In view of the correspondence between the intervals of time and the lengths of recording surface traversed in the representation of the binary information bits, the variable-rate coding scheme is hereinafter further denominated as the variable or non-uniform bit-length code. Because of the absence of practical systems for employing nonuniform rate signaling in conjunction with apparatus designed for uniform rate signaling, this variable rate hybrid NRZ coding arrangement has not been heretofore extensively utilized even though possessing the advantageous characteristics of compactness and self-synchronization which are both desirable from the standpoint of efficient information handling.

Accordingly, it is an object of the present invention to provide a practical code translating system for achieving compact information storage.

It is another object of the present invention to implement the translation of data between systems utilizing uniform and nonuniform-rate signaling.

It is another object of the present invention to provide a high information density, self-synchronizing, variable-rate recording apparatus.

As has been explained above, the use of a nonuniform bit-length code offers the possibility of achieving a compact, self-synchronizing code for the representation of digital information. The principles whereby the present invention provides for the translation of data into the nonuniform bit-length coding scheme may be explained, as follows: Recalling that the "0's" are represented in a two-time interval bit-length and that "1's" are represented in a single-time interval bit-length a character may be defined which consists of any desired number of time intervals. Within the character there may be formed all the combinations of double interval "0" bits and single interval "1" bits which completely fill the character. The number of "0's" and "1's" contained in a character under each of the combinations is determined by the ratio of their respective durations, which ratio in the illustrative nonuniform bit-length recording code above referred to is 2 to 1. The number, N, of different characters which may be formed corresponding to the various combinations is dependent upon the number, $n$, of time intervals comprising the character, thus:

$$N=\sum_{k=0}^{k=m}(n-k)^{C}(k)=\sum_{k=0}^{k=m}\left\{\frac{(n-k)!}{k!(n-2k)!}\right\}$$

where "$m$" is the largest integer in $n/2$ (i.e., the maximum number of "0's") and $k$ is the independent variable, the number of "0's" per character.

The considerable increase in the number of information bits which can be packed into a given number of time intervals by virtue of this nonuniform bit-length recording scheme over that afforded when the two-time-interval-per-bit scheme is used is illustrated in the following table:

*Table 1*

| | | | | | | | | | | |
|---|---|---|---|---|---|---|---|---|---|---|
| $n$ | 1 | 2 | 3 | 4 | 5 | 6 | 7 | 8 | 9 | 10 |
| N | 1 | 2 | 3 | 5 | 8 | 13 | 21 | 34 | 55 | 89 |
| $2^m$ | 0 | 2 | 2 | 4 | 4 | 8 | 8 | 16 | 16 | 32 |

Thus, for example, using $n$ equal to six-time intervals per character, there are thirteen different characters which can be formed containing two-time interval "0's" and single-time interval "1's" as compared to the only eight different characters which obtain when the two-time-interval-per-bit scheme is used.

In one specific illustrative embodiment, in accordance with the principles of this invention, there is provided a circuit for translating sets of four-bit, binary-coded characters into corresponding sets of uniquely coded six-element characters, both the four-bit and the six-element characters advantageously being of substantially the same time duration. A binary 1 digit in the four-bit binary-coded character is represented by a signal transition in a time interval of the six-element character and a binary zero digit in the four-bit binary-coded character is represented by a steady signal, i.e., the absence of a signal transition, in a time interval of the six-element character followed by the occurrence of a signal transition in the next successive time interval of the six-element character. The number of binary "0" digits in the four-bit character is determined, and signal transitions, in addition to those required to represent the binary "1" and "0" digits, are added to the six-element character when there are fewer than two binary "0's" in the four-bit character.

It is a feature of the present invention that means are provided for automatically translating sequences of binary digits at a rate determined by the individual values of the digits.

It is a feature of the present invention that elements of a stored information input character be altered in accordance with their digital values to form a translated information output character.

It is a feature of the present invention in one aspect thereof, that means are provided for automatically translating self-synchronized sequences of $p$-bit, $pq$-element characters into corresponding sequences of $p$-bit, $n$-element characters, wherein $n$ is less than $pq$.

It is a feature of the present invention that the readout of a particular value of stored input digit inhibit the readout of a succeeding stored digit to form an output digit sequence spaced in accordance with the digital values.

The foregoing and other objects and features may be more readily understood when read in conjunction with the following detailed specification and drawing in which.

Twelve of the thirteen possible combinations which, accordingly, may be formed in a six-element character are shown in the right-hand column of Table 2, below, together with the corresponding equivalents in the telegraphic and two-time-element-per-bit codes. The thirteenth possible combination (1111_1) of six bit elements as well as the four remaining combinations of the four-element telegraphic code are not tabulated since their elimination from the coding translation permits advantageous simplifications in the apparatus to be described.

*Table 2*

| | Intelligence Bits (Telegraphic Code) Four Elements | Two-Time-Interval-per-Bit Code, Eight Elements | Nonuniform Bit-Length Code, Six Elements |
|---|---|---|---|
| | Not self-clocking | Self-clocking | |
| 1 | 1111 | 11111111 | 111111 |
| 2 | 1110 | 111111_1 | 111_11 |
| 3 | 1101 | 1111_111 | 11_111 |
| 4 | 1011 | 11_11111 | 1_1111 |
| 5 | 0111 | _1111111 | _11111 |
| 6 | 1100 | 1111_1_1 | 11_1_1 |
| 7 | 1010 | 11_111_1 | 1_11_1 |
| 8 | 1001 | 11_1_111 | 1_1_11 |
| 9 | 0110 | _11111_1 | _111_1 |
| 10 | 0101 | _111_111 | _11_11 |
| 11 | 0011 | _1_11111 | _1_111 |
| 12 | 0000 | _1_1_1_1 | _1_1_1 |

It should be noted that the terms "element" and "bit," "binary digit," or "intelligence bits" are used in distinctive senses both in the captions of Table 2 as well as throughout the discussion herein presented. Thus, the terms "bit," "binary digit" and "intelligence bits" refer to a numerical quantity while the term "element" refers to the time interval within which a signal transition representative of a "binary digit" (or of a portion of a binary digit) may occur. More particularly, in the first column of Table 2, there are shown twelve four-bit sequences each of which, as has been explained above, may be represented in the Pouliart or telegraphic methods in just four-time intervals. In the second and third columns, respectively, the two-time-interval-per-bit and the nonuniform bit-length translations of the four-bit sequences are shown, the "1's" shown in the second and third columns representing signal transitions and the "_'s" each representing the absence of a transition.

Figure 1:
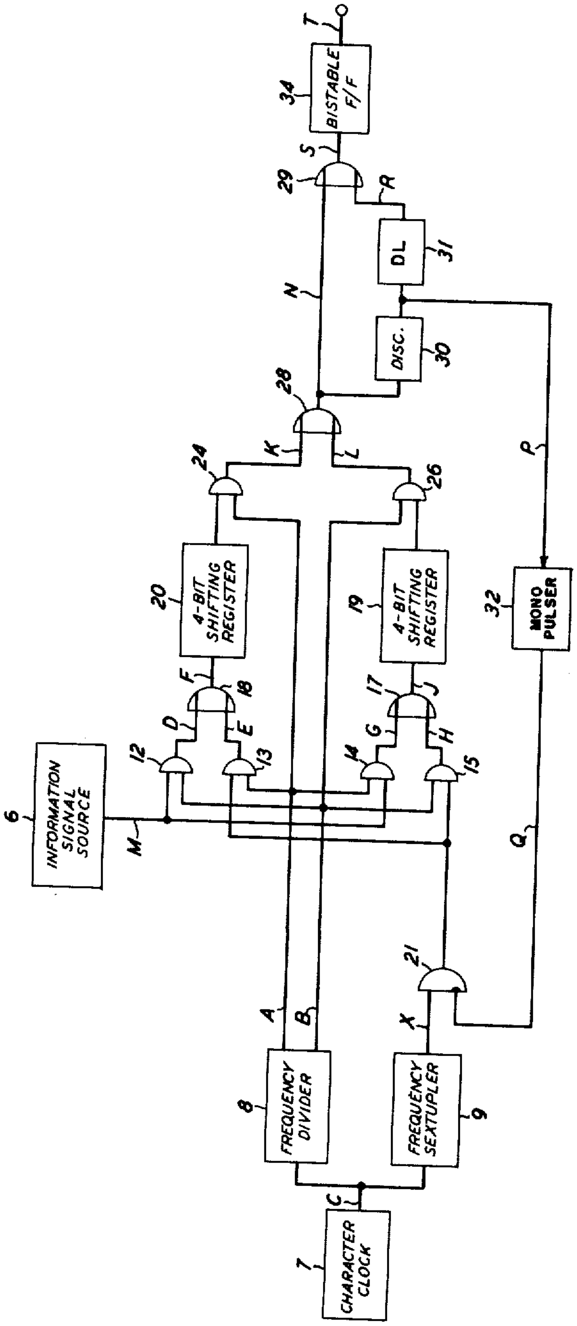
FIG. 1 shows a schematic representation of an illustrative embodiment of a code translator in accordance with the principles of this invention.

Referring now to FIG. 1 there is shown a data translating system for effecting the translation of the sequences of the first or second column of Table 2 to those of the third column of Table 2, comprising an information signal source 6 which supplies, over lead M, sequences of four-bit binary code groups consisting of "0" and "1" information bits. A character clock 7, whose period of repetition is equal to that of the groups of four-bit sequences supplied by soruce 6, is connected via lead C to a frequency sextupler 9 and to a frequency divider 8 whose A and B leads are altrenately energized during successive four-bit information sequences. The A lead of frequency divider 8 is connected to an activating input terminal of AND gate 14, the other terminal of AND gate 14 being connected to information source 6. The B lead of frequency divider 8 is connected to an activating input terminal of AND gate 12, the other input terminal of gate 12 being connected to information source 6. AND gates 14 and 12 are thus alternately activated by leads A and B and when so activated allow alternate four-bit signal sequences from source 6 to be applied to four-bit shifting register 19 and 20, respectively; OR gate 18 connecting AND gate 12 to register 20 and OR gate 17 connectiing AND gate 14 to register 19. The four-information bits stored in each of the registers 19 and 20 are read out alternately by means of the successive six-pulse signal sequences obtained from sextupler 9, the pulses delivered by sextupler 9 defining the six time intervals of the six element characters of the non-uniform bit-length code. Signals from sextupler 9 are coupled to an input terminal of each of AND gates 13 and 15 through inhibit gate 21, the other input terminal of AND gate 13 being connected to lead A of frequency divider 8 and the other input terminal of AND gate 15 being connected to lead B of frequency divider 8. AND gates 13 and 15 are thus alternately activated by leads A and B and when so activated couple alternate six-pulse sequences from sextupler 9 over leads E and H to OR gates 18 and 17, respectively. OR gates 17 and 18 are connected to registers 19 and 20 by leads J and F, respectively.

Assuming the A lead of frequency divider 8 to be energized, four-information bits from signal source 6 will be applied to four-bit register 19 via AND gate 14 and OR gate 17. Simultaneously, selected ones of the six pulses produced by sextupler 9 will be applied to register 20 via inhibit gate 21, AND gate 13 and OR gate 18. When the B lead of frequency divider 8 is subsequently energized, the four-information bits stored in shifting register 19 will be pulsed out of register 19 by selected ones of the signals from sextupler 9 applied to register 19 via inhibit gate 21, AND gate 15, and OR gate 17. The A lead of frequency divider 8 in addition to being connected to an input terminal of AND gates 13 and 14 is also connected to an input terminal of AND gate 24, and similarly the B lead of frequency divider 8 in addition to being connected to an input terminal of AND gates 12 and 15 is also connected to an input terminal of AND gate 26. Thus, during the time that signals from sextupler 9 are causing the four-information bits stored in register 19 to be read out, AND gate 26 is energized and, similarly, when the pulses from sextupler 9 are causing the four-information bits stored in register 20 to be read out, AND gate 24 is actuated by the A lead of frequency divider 8. The output terminals of AND gates 24 and 26 are coupled to a respective input terminal of OR gate 28.

Thus far, it is seen that during activation of the A lead of frequency divider 8 AND gates 14, 13 and 24 are simultaneously activated, thereby permitting a four-bit information sequence to be read into shifting register 19 as well as allowing a six pulse sequence from sextupler 9 to cause a four-bit information sequence that had been priorly pulsed into shifting register 20, to be read out. The output terminal of OR gate 28 is coupled to an input terminal of OR gate 29 as well as to the input of discriminator 30. Discriminator 30 functions to produce a signal at its output only when a "0" signal is coupled to its input from either of registers 19 or 20 and the particular characteristics of discriminator 30 advantageously may be determined in accordance with the particular type of shift registers 19 and 20 that are employed. For example, when shift registers 19 and 20 are of the type which will read out a "1" as a signal of a first predetermined amplitude or polarity and which will read out a "0" as a signal of different predetermined amplitude or polarity, then discriminator 30 may be selected from any of the well-known devices which produce at its output P no signal when the signal of first predetermined amplitude or polarity appears on lead N, and which produces a signal at its output P when the signal of different predetermined amplitude or polarity appears on lead N. On the other hand, where shift registers 19 and 20 are selected from any of the well-known types which read out a stored "0" bit by the production of a "no-signal" output, then in addition to the circuitry shown in FIG. 1 there advantageously may be provided an additional synchronizing input to discriminator 30 from output lead X of sextupler 9 to enable discriminator 30 to distinguish between the signal condition occurring on lead N which corresponds to a "0" information bit and the signal condition which occurs on lead N when gate 21 is inhibited, i.e., when neither a "1" or a "0" is being read out of either of the registers 19 or 20. Numerous examples of suitable shift registers, discriminators and gates may be found in well-known texts and articles, for example, R. K. Richards' "Digital Computer Components and Circuits" published by D. Van Nostrand Co., Inc.

The output of discriminator 30 is coupled to pulse delay unit 31 and to monopulser 32. Monopulser 32 when triggered by a signal appearing at the output lead P of discriminator 30 (which output as described above appears only when a "0" bit is pulsed out of shifting registers 19 or 20) applies to the inhibit terminal of inhibit gate 21 a pulse whose duration is somewhat longer than the interval between successive pulses from sextupler 9.

The read out of information stored in registers 19 and 20 by the signals of sextupler 9 as controlled by the operation of discriminator 30 and monopulser 32 may be explained as follows: Assuming that the B lead of frequency divider 8 is energized and that the sequence "0111" is to be pulsed out of shifting register 19, the first pulse of the six-pulse sequence from sextupler 9 will not be impeded by inhibit gate 21 since no signal has as yet been applied to the inhibit terminal of inhibit gate 21. This first pulse of the six-pulse sequence is applied to shifting register 19 via the activated AND gate 15 and OR gate 17. Application of the first pulse of the six-pulse sequence to shifting register 19 causes the "0" bit stored in the output stage of register 19 to be pulsed into discriminator 30 via the activated AND gate 26 and OR gate 28. Discriminator 30 sensing the "0" bit, as described above, triggers monopulser 32 whose output pulse persists long enough so that the inhibit terminal of inhibit gate 21 is energized throughout the duration of the second pulse of the six-pulse sequence produced by sextupler 9. Thus, the second of the six-pulses is not applied to shifting register 19 and none of the remaining information bits stored in the register 19 are pulsed out during this second pulse of the six-pulse sequence. During the third, fourth, and fifth pulses of the six-pulse sequence, the binary "1" bits stored in register 19 are pulsed out on lead N, and since discriminator 30 produces no output in response to binary "1's," the inhibit terminal of gate 21 is not energized. The successive advancement of the stored binary information bits to the output stage of register 19 is accompanied by the coincidental setting of the input and successive stages of register 19 to the binary "1" state so that after the read out of the four binary bits which were introduced by source 6 has been effected, all four stages of register 19 are in the "1" state. Consequently, the sixth pulse of the six-pulse sequence when applied to the input of register 19 causes a binary "1" to appear on output lead N.

Returning now to the consideration of the binary "0" bit pulsed out on lead N by the first pulse of the six pulse sequence, it is seen that this "0" bit is applied to both input lead S of bistable flip-flop 34 as well as to the input of discriminator 30. In accordance with the above discussed characteristics of the shift registers 19 and 20 the signal condition occurring on lead N which signals are representative of a binary "0" bit may advantageously be of a distinctively different amplitude or polarity than the signal conditions occurring on lead N which conditions are representative of a binary "1" bit. Thus, for example, the amplitude of the binary "0" bit when applied to the input lead S of bistable flip-flop 34 may profitably be of lesser amplitude than that of a binary "1" bit and in this case the amplitude of the binary "0" bit will be insufficient to trigger bistable flip-flop 34. However, the amplitude of the binary "0" bit is sufficient to actuate discriminator 30 which produces a signal on output lead P which signal in addition to being coupled to monopulser 32 as described above is also coupled to delay element 31. After undergoing in element 31 a delay equal to the interval between a pair of successive pulses of the six-pulse sequences supplied by sextupler 9, the signal on lead P appears on output lead R. Thus, during the second pulse of the six-pulse sequence supplied by sextupler 9, there is applied via OR gate 29 a signal to lead S of sufficient amplitude to trigger bistable flip-flop 34. The third, fourth, fifth and sixth pulses of the six-pulse sequence activate bistable flip-flop 34 directly via lead N since discriminator 30 produces no signal on lead P in response to a binary one bit appearing on lead N.

Bistable flip-flop 34 when activated by the application of a pulse to input lead S effects a change in the potential of output lead T. The potential appearing on output lead T may in accordance with well-known magnitude recording techniques be applied through suitable writing amplifiers to a magnetic recording head for the recordation of the translated intelligence supplied by source 6.

Figure 2:
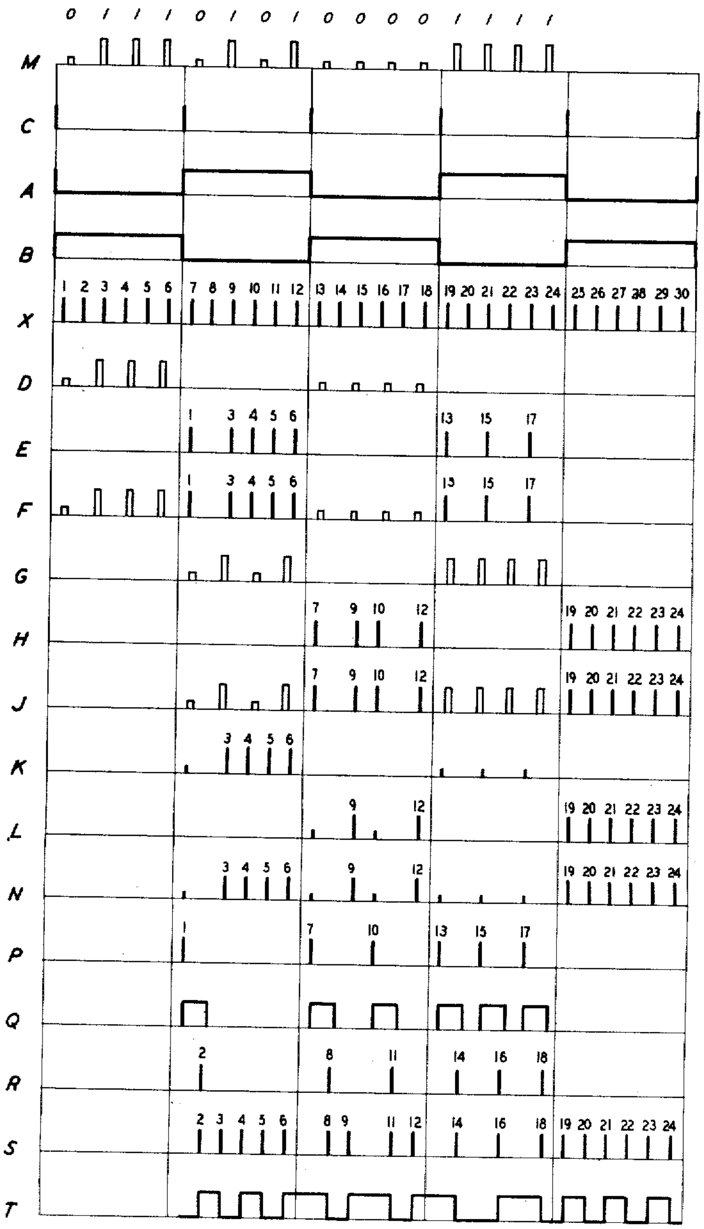
FIG. 2 shows the waveforms occurring at the indicated points of FIG. 1.

Referring now to FIG. 2 there is shown in time relationship the wave forms appearing at the indicated leads of FIG. 1. At M in the first column of FIG. 2 there is shown the information sequence 0111 (expressed in the form of a return-to-zero, RZ code) in relationship to the character clock pulses appearing at lead C, the frequency divider signals appearing on leads A and B, and the six-pulse sequences appearing on lead X. It is thus seen that a positive signal on lead B activates AND gate 12, the output of which is shown at D and F. The second column of FIG. 2 shows wave forms occurring one character later in time. The first pulse (pulse number 7) of the six-pulse sequence at X occurring during this second character period effects the read out of the binary "0" digit stored in the output storage of shift register 19 as shown at K and N. Discriminator 30, responsive to the "0" signal appearing at N produces the output shown at P, and this output, delayed, appears at R. The output of monopulser 32 appears at Q and blocks pulse number 8 from appearing at E, F, K and N. The pulses from sextupler 9, as selected by monopulser 32 and inhibit gate 21, are shown at E and H. The input to the bistable flip-flop 34 is shown at S, the "0" signals of lead N being eliminated from consideration as being of insufficient amplitude to trigger flip-flop 34. The output of flip-flop 34 appears at T. Similarly, the sequences 0101, 0000, and 1111 are shown in the second, third, fourth and fifth columns, it being apparent that the encoded characters appear at T one character interval after being introduced at M.

Figure 3:
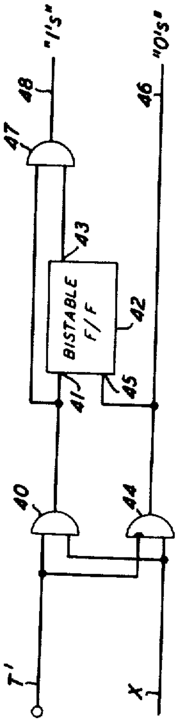
FIG. 3 shows a schematic representation of a translator for use in decoding the intelligence encoded by the apparatus of FIG. 1.

In FIG. 3 there is shown a circuit for translating from the nonuniform bit-length code such as would be sensed by a reading head in the process of reproducing binary information signals recorded on a magnetic member in accordance with the encoding system of FIG. 1, to double rail binary output. The signals from the magnetic head after being amplified in suitable reading amplifiers are applied to terminal T′ of FIG. 3 (these signals being essentially the derivative of those appearing at terminal T of FIG. 1, i.e., pulses occur at the points of transition) and six-pulse sequences such as those appearing on lead X of FIG. 1 are apparent at X in FIG. 3. The simultaneous occurrence of a signal transition at lead T′ and a pulse at lead X actuate AND gate 40 which applies a pulse to the reset terminal 41 of flip-flop 42. The reset condition of flip-flop 42 is indicated by a signal at output terminal 43. Inhibit gate 44 will be in the blocked condition due to the application of the transition pulse to its inhibit input terminal. When, however, no signal transition impulse is applied to lead T′ the clock pulse applied to inhibit gate 44 will not be impeded and will be applied to the set terminal 45 of flip-flop 42. The flip-flop 42 will be set causing the reset signal to be removed from output terminal 43. Simultaneously, "0" output lead 46 will be activated. During the next clock pulse, in accordance with the principles of nonuniform bit-length recording in the representation of the two-element "0" digit, there will be applied a transition signal impulse to the lead T′. The output lead 48 must not be energized at this time since this transition signal is not representative of a "1" digit. The prevention of activation of lead 48 is accomplished as follows. The transition signal impulse which occurs during the second clock pulse of the two-element "0" digit will activate AND gate 40 and terminal 41 and cause flip-flop 42 to commence reset. However, the signal at output lead 43 will not be present until the flip-flop has been completely reset, and since reset is not completed during the interval of the transition signal pulse output AND gate 47 will not be activated and hence lead 48 will not be energized.

It is to be understood that the above-described arrangements are illustrative of the application of the principles of the invention. Numerous other arrangements may be devised by those skilled in the art without departing from the spirit and scope of the inevntion.

What is claimed is:

1. A data sequence translating system comprising a source of data signals having distinctive values and grouped in accordance with a uniform length code, a data store, said store having an input and an output, said input being connected to said source, readout means coupled to said input for selectively releasing said data signals to said output in a variable length binary self-clocking code, control means coupled to said output and to said readout means, said control means including means for operating said readout means in response to the release of a particular value signal at said output and for selectively inhibiting said readout means in response to the release of signals of other than said particular value, first bistable state switching means coupled to said output and actuable by the release of said signals of other than said particular value, and signal conversion circuit path means coupled to said control means for actuating said switching means when said readout means is operated.

2. A data sequence translating system in accordance with claim 1 wherein said data store includes multi-stage storage means, wherein said readout means comprises a source of sequential pulses, each of said pulses releasing a corresponding one of said data signals to said output and wherein said control means operates said readout means to inhibit one of said sequential pulses.

3. Data sequence translating system in accordance with claim 2 wherein said readout means further comprises inhibit gate means normally coupling said source of pulses to said input, and wherein said control means is coupled to said gate means for inhibiting said one of said pulses.

4. A data sequence translating system comprising a source of data signals having distinctive values, a data store, said store having an input and an output, said input being connected to said source, readout means coupled to said input for selectively releasing said data signals to said output, control means coupled to said output and to said readout means, said control means operating said readout means in response to the release of a particular value signal at said output, first bistable state switching means coupled to said output and actuable by the release of said signals of other than said particular value, signal conversion circuit path means coupled to said control means for actuating said switching means when said readout means is operated, said data store including multi-stage storage means, said readout means comprising a source of sequential pulses, each of said pulses releasing a correponding one of said data signals to said output, said control means operating said readout means to inhibit one of said sequential pulses, said readout means further comprising inhibit gate means normally coupling said source of pulses to said input, means coupling said control means to said gate means for inhibiting said one of said pulses, wherein said control means comprises discriminator means having a first and a second terminal, said first terminal being coupled to said output, said discriminator producing an activation signal at said second terminal in response to said particular value signal at said input, and means connected to said second terminal for applying said activation signal to said gate means throughout the duration of said one of said pulses.

5. A data sequence translating system in accordance with claim 4 wherein the said one of said sequential pulses is the pulse immediately following the release of one of said particular value signals.

6. A data sequence translating system in accordance with claim 5 wherein said conversion path means is coupled to said second terminal for delaying said activation signal for an interval equal substantially to the interval between a pair of said sequential pulses.

7. A data sequence translating system in accordance with claim 6 further comprising a decoding circuit including a second bistable switching circuit exhibiting set and reset conditions and having a set terminal, a reset terminal and an output terminal, said output terminal being energized when said circuit is in said reset conditions, said first switching means having an output electrode, means for coupling said output electrode to said reset terminal, selective gate means for coupling said source of sequential pulses to said set terminal, means coupled to said selective gate means and to said output electrode for inhibiting said selective gate means, and means coupled to said reset terminal and to said output terminal for detecting the simultaneous energization of said reset and said output terminals.

8. A code conversion apparatus comprising means for producing groups of binary information bit signals, said binary bit signals being of two types, and means for producing a plurality of replacement signals for each of said groups, said last-mentioned means including means for transmitting one of said replacement signals for each of one type of said binary signals, means for inhibiting during a normal transmission interval one of said replacement signals and transmitting during a normal transmission interval, a further one of said replacement signals for each of the other type of said binary signals, and means for transmitting additional ones of said replacement signals for said groups having less than a predetermined number of said other of said binary signals.

9. A code conversion apparatus according to claim 8 wherein said means for producing said replacement signals comprises a source of sequential pulses, bistable state switching means, and means for selectively coupling said pulses to said switching means.

10. A code conversion apparatus according to claim 9, wherein said first-mentioned means for transmitting comprises register means for storing said groups of information signals, and means for coupling said source to said register selectively to read out said information signal.

11. A code conversion apparatus according to claim 10 wherein said means for inhibiting and transmitting said replacement signals comprises discriminator means coupled to said register and responsive to the presence of said other of said bit signals, inhibit gate means coupling said source to said register, monopulser means coupling said discriminator and said inhibit gate means, and delay circuit means coupling said discriminator and said switching means.

12. A cole conversion apparatus comprising a source of $f$-bit binary coded character signals, each of said binary bits being of two types, a source of $s$-element replacement signals, the duration of $s$-elements of said replacement signals corresponding to that of $f$-bits of said character signals, where $s$ is a number larger than $f$, and variable length binary self-clocking encoding means coupled to said $f$-bit and to said $s$-element sources for storing both types and transmitting one type of said binary signals during corresponding signal intervals of said $f$-bit and said $s$-element signals, respectively, and means for controlling said storing and transmitting means to transmit the other type of said binary signal during more than one element interval of said $s$-element signals.

13. A code conversion apparatus according to claim 12 further comprising means for determining the number of bits of said first type in said $f$-bit character and means responsive to said last-mentioned means for controlling the number of signals transmitted by said storing and transmitting means.

References Cited in the file of this patent

UNITED STATES PATENTS

| | | |
|---|---|---|
| 2,709,199 | Van Duuren | May 24, 1955 |
| 2,785,388 | McWhirter et al. | Mar. 12, 1957 |
| 2,840,637 | McNaney et al. | June 24, 1958 |
| 2,887,674 | Greene | May 19, 1959 |
| 2,911,625 | Chien | Nov. 3, 1959 |